Aug. 14, 1962  A. W. DIACK  3,049,071
UNIVERSAL COOKER
Filed April 18, 1960
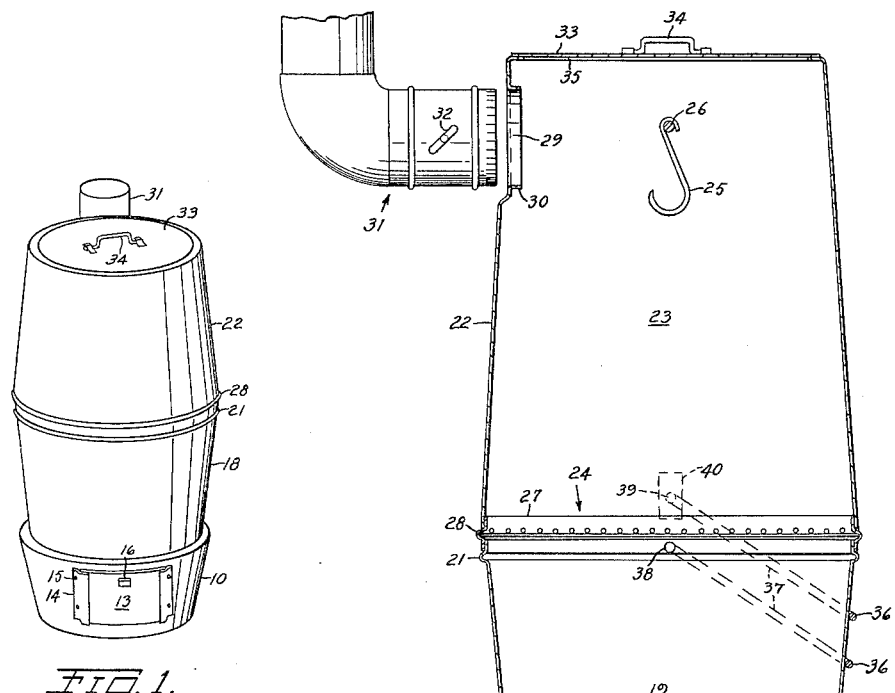
FIG. 1.
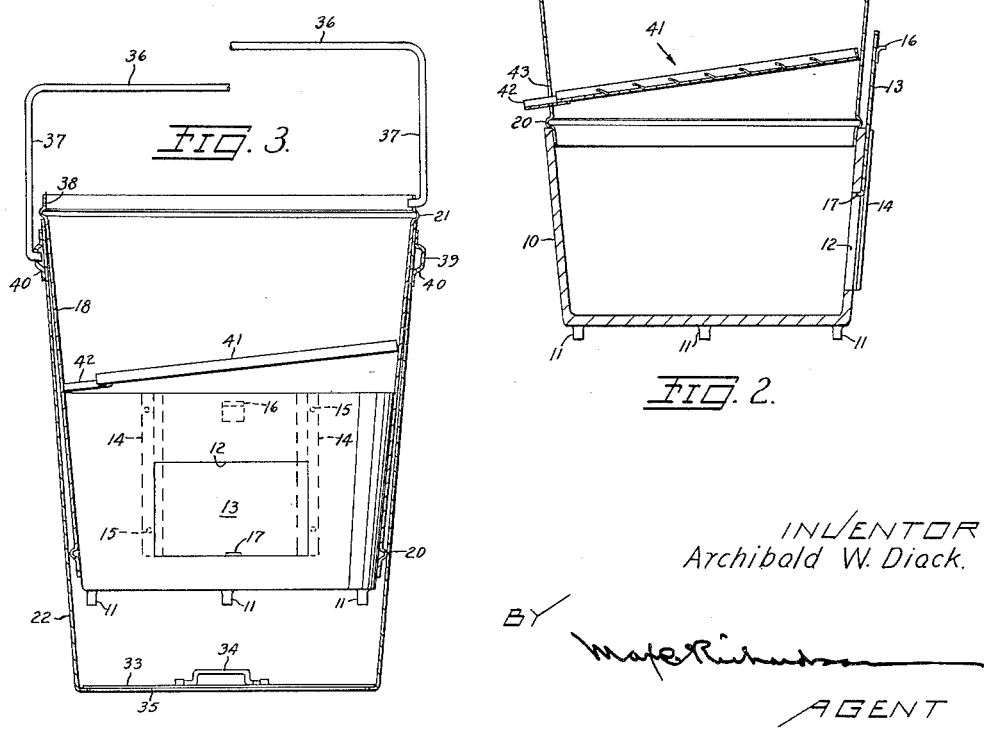
FIG. 3.
FIG. 2.
INVENTOR
Archibald W. Diack.
BY
Mafe Richardson
AGENT

United States Patent Office 3,049,071
Patented Aug. 14, 1962

3,049,071
UNIVERSAL COOKER
Archibald W. Diack, 3386 SW. Fairmount Blvd.,
Portland, Oreg.
Filed Apr. 18, 1960, Ser. No. 22,874
3 Claims. (Cl. 99—340)

My invention, here first disclosed, relates generally to ovens, roasters, broilers, smokers, or similar enclosures in which food is cooked by the application of heat thereto. More particularly my invention relates to such a cooking apparatus which is internally fired and which may be disassembled and quickly packed for easy transportation and reassembly at a new location.

It is a primary object of this invention to provide a cooker in which food as selected may be either hung or supported and appropriately cooked in an atmosphere of the combustion products of selected aromatic wood charcoal as desired.

It is a second object to provide such a cooker of which the parts can be readily disassembled without tools and nested in one of the parts for convenient transportation to a new location and easily reassembled without tools for use at the new location.

It is a third object to provide such a cooker which can be used outdoors without interference from the usual climatic conditions as found or which can be used indoors without damage to the usual lodge or tent in which it would be used or distress to the occupants thereof.

It is a fourth object to provide such a cooker with an open topped refractory metal firepot at its bottom end having a fuel feeding and draft control door opening formed through one side of the upwardly diverging conical wall thereof and means for controlling the size of the opening to aid in controlling the rate of oxidation of fuel in said pot and the excess air in the products of combustion therefrom.

It is a fifth object to provide such a cooker with an open ended upwardly diverging conical extension of its firepot to form a combustion completing chamber extension therefor.

It is a sixth object to provide such a cooker with an open ended upwardly converging conical extension of its combustion completing chamber to form a cooking chamber therefor.

It is a seventh object to provide the combustion completing chamber of such a cooker with a heat-spreading and drip receiving grating near the lower end thereof, the grating being formed with upwardly directed holes therethrough for passing products of combustion and means for substantially preventing cooking material from dropping therethrough, the grating being generally flat and oval in outline to engage the chamber wall above the firepot at an angle above the horizontal to direct the liquid cooking droppings to the low side of the grating where the grating includes a trough extending through a hole formed through the wall of the chamber.

It is an eighth object to provide such a cooker at the adjacent larger open ends of said combustion chamber and said cooking chamber with a removable circular horizontal grill for broiling food thereon, the grill being formed with a rim therearound for sealingly extending the upper edge of said combustion chamber and supporting said grill thereon and for extending upwardly from the grill to limit the lateral movement of food thereon and for sealingly receiving the lower edge of the cooking chamber wall thereon.

It is a ninth object to complete the enclosing wall of said cooker by providing a handled lid for the upper smaller end opening of its cooking chamber.

It is a tenth object to provide said cooking chamber near its top with outlet means through a wall thereof for the mixed combustion gases and cooking vapors therein together with means for controlling the passage of the gases and vapors therethrough.

It is an eleventh object of this invention to provide in said cooking chamber means for supporting as desired the foodstuff to be cooked therein.

It is a twelfth object to provide the conical open ended wall of said cooking chamber with bail means at the larger end thereof for suspending said wall to form a carrying container for the other parts of said cooker, in which case the lid for the smaller end of said wall is placed inside said wall to close the lower end opening of said container.

How these and other objects are attained is explained in the following disclosure including the attached drawing in which—

FIG. 1 is a view in perspective elevation of the assembled cooker of this invention.

FIG. 2 is an enlarged view in right sectional elevation of the assembled cooker of this invention.

FIG. 3 is a view in sectional elevation of the parts of the same cooker assembled in one of the parts for storage or transportation.

Like reference numerals refer to like parts in the several figures of the drawing.

Referring now to the drawing, the upwardly expanding, open topped, conical, cast iron, firepot 10 is formed with four equally spaced supporting legs 11 and a rectangular door opening 12 formed through a wall thereof. In FIG. 2 the opening 12 is shown open and in FIG. 3 the opening 12 is shown closed by a sliding door 13 slidably secured to the wall of firepot 10 by offset straps 14 held to firepot 10 by screws 15. As shown, door 13 has attached to its outer side near its top a finger latch 16 by which it can be vertically positioned and on the inside an open and close limit lug 17 which is vertically limited in movement by the upper and lower boundaries of door opening 12.

The conical wall 18 of combustion chamber 19 is seen to have annular step grooves 20 and 21 rolled therein from the inside for limiting the telescoping action of wall 18 as it is assembled to firepot 10 and for limiting the telescoping action of wall 22 of cooking chamber 23 as it is assembled to wall 18 of combustion chamber 19.

It should be noted that grill 24 is for the purpose of supporting the food being cooked in a horizontal position and can be omitted if the food is to be hung on hooks 25 multiply supported on bar 26 supported diametrically across cooking chamber 23 in holes formed in wall 22.

As previously noted when grill 24 is not used wall 22 telescopes directly with wall 18 but when grill 24 is used wall 22 telescopes over the top edge of outer band 27 of grill 24 down to its annular projection 28 and below projection 28 the lower edge of outer band 27 telescopes over the upper edge of wall 18 of chamber 19.

A circular hole 29 with an inwardly extending cylindrical collar 30 is formed in wall 22 near the upper end of cooking chamber 23 to receive as desired a smoke pipe 31 fitted with a damper 32. A thimble, not shown, can be used temporarily to close the outlet 29 and the lid 33 can be moved by its handle 34 to uncover part of the hole 35 forming the open smaller end of space 23 to control the escape of gases and vapors from space 23 should the smoke pipe be unavailable. Note in FIG. 3 that the lid 33 with its handle 34 can be placed in the bottom of the inverted combustion chamber wall 22 to form a closed bottom for the container in which the parts are assembled for storage.

A single swingable bail 36 is seen to be appropriately usable for handling either the combustion chamber enclosure 18 or the cooking chamber enclosure 22. The resilient metal arms 37 of bail 36 are easily sprung outwardly and guided in the return to engagement with either holes 38 in wall 18 of chamber 19 or holes 39 in bail supports 40 of wall 22 of chamber 23.

An important part of this invention is the method of preventing the contamination of the food being cooked by preventing the circulation thereabout of the products of combustion of food fats and oils which might drip into the fire. For this purpose an oval shallow pan 41 provided with a narrow drain trough 42 on one end of its long diameter is placed in combustion chamber 19 with the trough 42 extending out through a slot 43 in wall 18. The pan being oval in outline will tip to contact the chamber walls and is so placed that tongue 42 will drain the grease dripping into the pan to the outside of the cooker where it can be caught if desired or otherwise disposed of. As shown in FIG. 2 a series of long parallel slits are formed in the bottom of the pan 41 perpendicular to the long diameter of the oval and metal along the upper side of each slit is pushed upward into the pan to form uniformly distributed openings for the products of combustion of the fuel to enter the combustion chamber from the firepot and complete their combustion. Also the raised metal along the slots in the bottom of the pan combined with the tipped position of the pan gives roof type protection for the holes from the passage therethrough of liquid and solid food material. The wide distribution of the hot gases passing through the slots of the tilted pan prevents the formation of such hot spots thereon as immediately will scorch the material falling thereon. Instead the form and position of pan 41 will cause these odor causing oils and liquids to drain off before they are burned thus in no way permitting this waste material to impair the taste or smell of the food being cooked.

Having recited some of the objects of this invention, illustrated and described a preferred form in which the invention may be practiced and explained its operation I claim:

1. A portable knockdown type of cooking enclosure including means therein by which food as selected may be selectively hung or supported and appropriately cooked in an atmosphere of the combustion products of selected aromatic wood charcoal as desired, said enclosure including in a vertical sequential separable arrangement open one to the other, means forming an upwardly expanding firepot, means forming an upwardly expanding combustion chamber and means forming an upwardly contracting cooking chamber, said firepot means being formed with a hole through one side thereof for the admission of fire supporting fuel elements and said cooking chamber means being formed with an outlet near the top thereof for permitting the escape therefrom of the products of combustion, said combustion chamber including means forming a hole in a wall thereof near its firepot end and means forming a tilted shallow pan with spaced holes formed upwardly through the bottom thereof uniformly to spread the combustion products passing upwardly therethrough from the firepot and through the combustion chamber, said pan including means formed upwardly on the bottom thereof for preventing drippings from cooking in the enclosure thereabove from passing through said holes into the firepot, and trough means extending the bottom of said pan at the low point thereof through said hole formed in said wall of said combustion chamber for the purpose of vertically locating said pan and preventing the contamination by burning food of the carefully prepared cooking atmosphere in the combustion chamber and the cooking chamber.

2. A portable knockdown type of cooking enclosure including means therein by which food as selected may be selectively hung or supported and appropriately cooked in an atmosphere of the combustion products of selected aromatic wood charcoal as desired, said enclosure including in a vertical sequential separable arrangement open one to the other, means forming an upwardly expanding firepot, means forming an upwardly expanding combustion chamber, and means forming an upwardly contracting cooking chamber, said firepot means being formed with a hole through one side thereof for the admission of fire supporting fuel elements and said cooking chamber means being formed with an outlet near the top thereof for permitting the escape therefrom of the products of combustion, said combustion chamber and said cooking chamber being separable one from the other and conical in exterior shape whereby said firepot can be nested within said combustion chamber in an upright position and said combustion chamber can be nested with said cooking chamber when said cooking chamber is inverted, each of said combustion chamber and said cooking chamber being formed with diametrically opposed holes formed in the walls thereof near their widest diameter ends, said enclosure including a bail therewith usable with either said combustion chamber or said cooking chamber when selectively engaged with either of them through the said holes in their selected walls.

3. A portable knockdown type of cooking enclosure including means therein by which food as selected may be selectively hung or supported and appropriately cooked in an atmosphere of the combustion products of selected wood charcoal as desired, said enclosure including in a vertical sequential separable arrangement open one to the other, means forming an upwardly expanding firepot, means forming an upwardly expanding combustion chamber and means forming an upwardly contracting cooking chamber, said firepot means being formed with a hole through one side thereof for the admission of fire supporting fuel elements and said cooking chamber means being formed with an outlet near its top for permitting the escape therefrom of the products of combustion, said combustion chamber near its top including an open grill thereacross for supporting foodstuff to be cooked in a prone position transversely of the direction of movement of the heating atmosphere therepast, said open grill including an encircling band extending downwardly from said grill overlappingly to engage the top of the side wall of said combustion chamber and upwardly from said grill to engage the bottom of the side wall of said cooking chamber, whereby said cooking enclosure without said cooking chamber but with said grill becomes a cooking means of the outdoor grill or barbecue type and by the addition thereto of the cooking chamber becomes a cooking means of the Chinese oven type which by longer operation with a reduced air fuel ratio becomes a wood charcoal flavoring baking oven.

References Cited in the file of this patent

UNITED STATES PATENTS

| | | |
|---|---|---|
| 37,926 | Smith | Mar. 17, 1863 |
| 282,235 | Stern | July 31, 1883 |
| 1,485,292 | Popper | Feb. 26, 1924 |
| 2,095,745 | Hiatt | Oct. 12, 1937 |
| 2,517,254 | Steele | Aug. 1, 1950 |
| 2,607,334 | Perlman | Aug. 19, 1952 |
| 2,833,201 | Simank | May 6, 1958 |
| 2,846,937 | Jones | Aug. 12, 1958 |
| 2,894,448 | Henderson et al. | July 14, 1959 |